(12) United States Patent
Nakanishi

(10) Patent No.: US 8,527,569 B2
(45) Date of Patent: Sep. 3, 2013

(54) PARALLEL PROCESSING METHOD OF TRIDIAGONALIZATION OF REAL SYMMETRIC MATRIX FOR SHARED MEMORY SCALAR PARALLEL COMPUTER

(75) Inventor: Makoto Nakanishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 831 days.

(21) Appl. No.: 12/550,040

(22) Filed: Aug. 28, 2009

(65) Prior Publication Data
US 2009/0319592 A1    Dec. 24, 2009

Related U.S. Application Data

(63) Continuation of application No. PCT/JP2007/000424, filed on Apr. 19, 2007.

(51) Int. Cl.
*G06F 7/38* (2006.01)

(52) U.S. Cl.
USPC .......................................................... 708/446

(58) Field of Classification Search
None
See application file for complete search history.

(56) References Cited

U.S. PATENT DOCUMENTS

| | | | |
|---|---|---|---|
| 5,790,598 A * | 8/1998 | Moreland et al. | 375/233 |
| 2002/0091909 A1 | 7/2002 | Nakanishi | |
| 2003/0182518 A1 | 9/2003 | Nakanishi | |
| 2003/0187898 A1 * | 10/2003 | Nakanishi | 708/520 |
| 2006/0212868 A1 | 9/2006 | Takayama et al. | |

FOREIGN PATENT DOCUMENTS

| | | |
|---|---|---|
| JP | A 2002-163246 | 6/2002 |
| JP | A 2004-5488 | 1/2004 |
| JP | A 2004-5528 | 1/2004 |
| JP | A 2006-259821 | 9/2006 |

OTHER PUBLICATIONS

Gene H. Golub, et al. "Matrix Computations," Second Edition, Johns Hopkins University Press, pp. 418-421, 1989.
Jaeyoung Choi, et al., "The Design of a Parallel Dense Linear Algebra Software Library: Reduction to Hessenberg, Tridiagonal, and Bidiagonal Form," Engineering Physics and Mathematics Division, Mathematical Sciences Section, Prepared by the Oak Ridge National Laboratory, U.S. Department of Energy, Jan. 1995.

* cited by examiner

*Primary Examiner* — Ilwoo Park
*Assistant Examiner* — Aurangzeb Hassan
(74) *Attorney, Agent, or Firm* — Greer, Burns & Crain, Ltd.

(57) ABSTRACT

When a real symmetric matrix is tridiagonalized using a shared memory scalar parallel computer, the matrix is divided into threads to be updated. In the updating, the data of the lower triangular portion is for the calculation utilizing the symmetry in the matrix. The lower triangular matrix portion is divided into columns, and the resultant pieces are assigned to respective CPUs so that an equal number of elements are assigned to each of the CPUs. Also, the computation is performed simultaneously in the column and row directions once for each loading of the data in order to reduce the number of times data is loaded into memory. The lower triangular matrix portion of the diagonal block matrix portion is divided into one small square matrix and two small triangular matrices recursively so that they are updated.

5 Claims, 22 Drawing Sheets

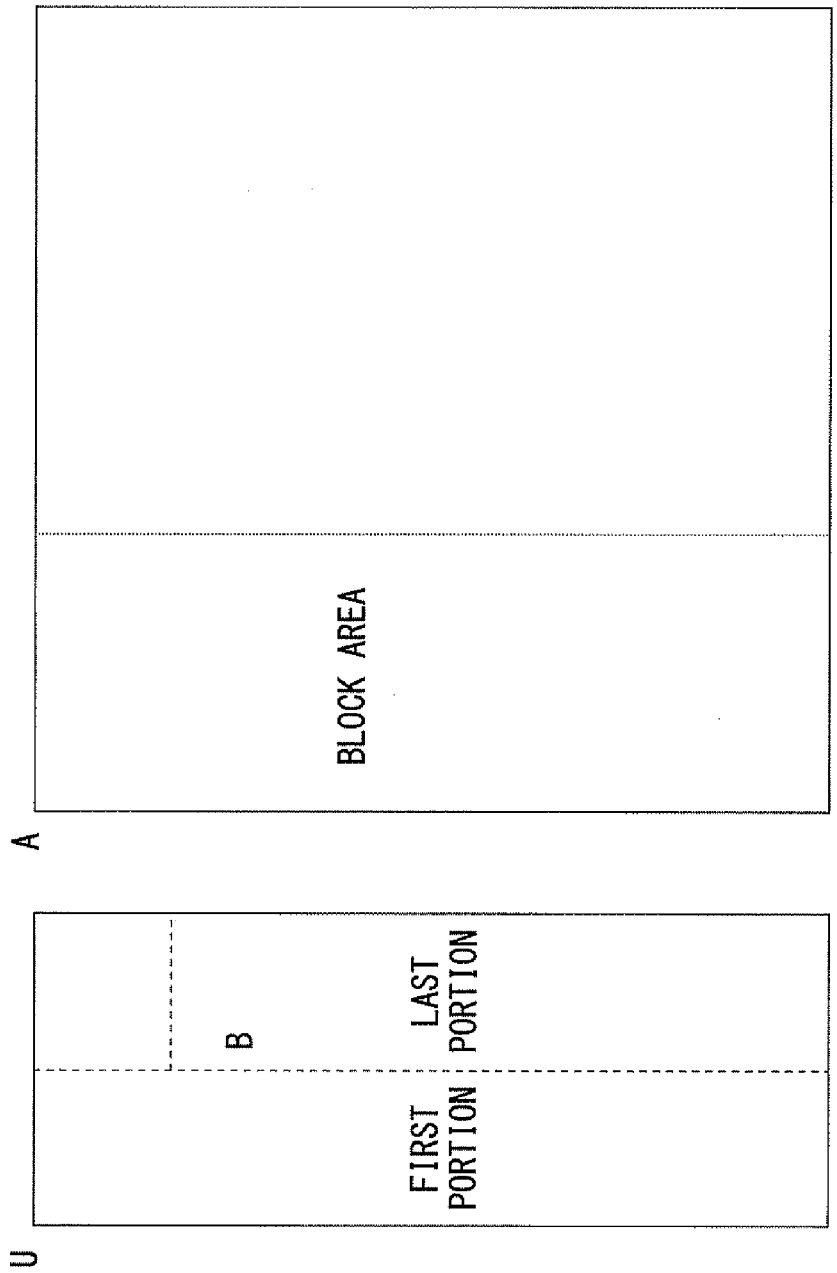

$A_{n+1}$ $A_{n+1}$

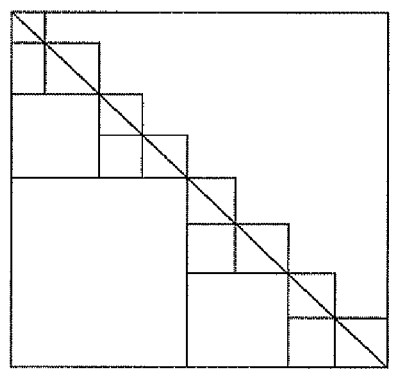
F I G. 7

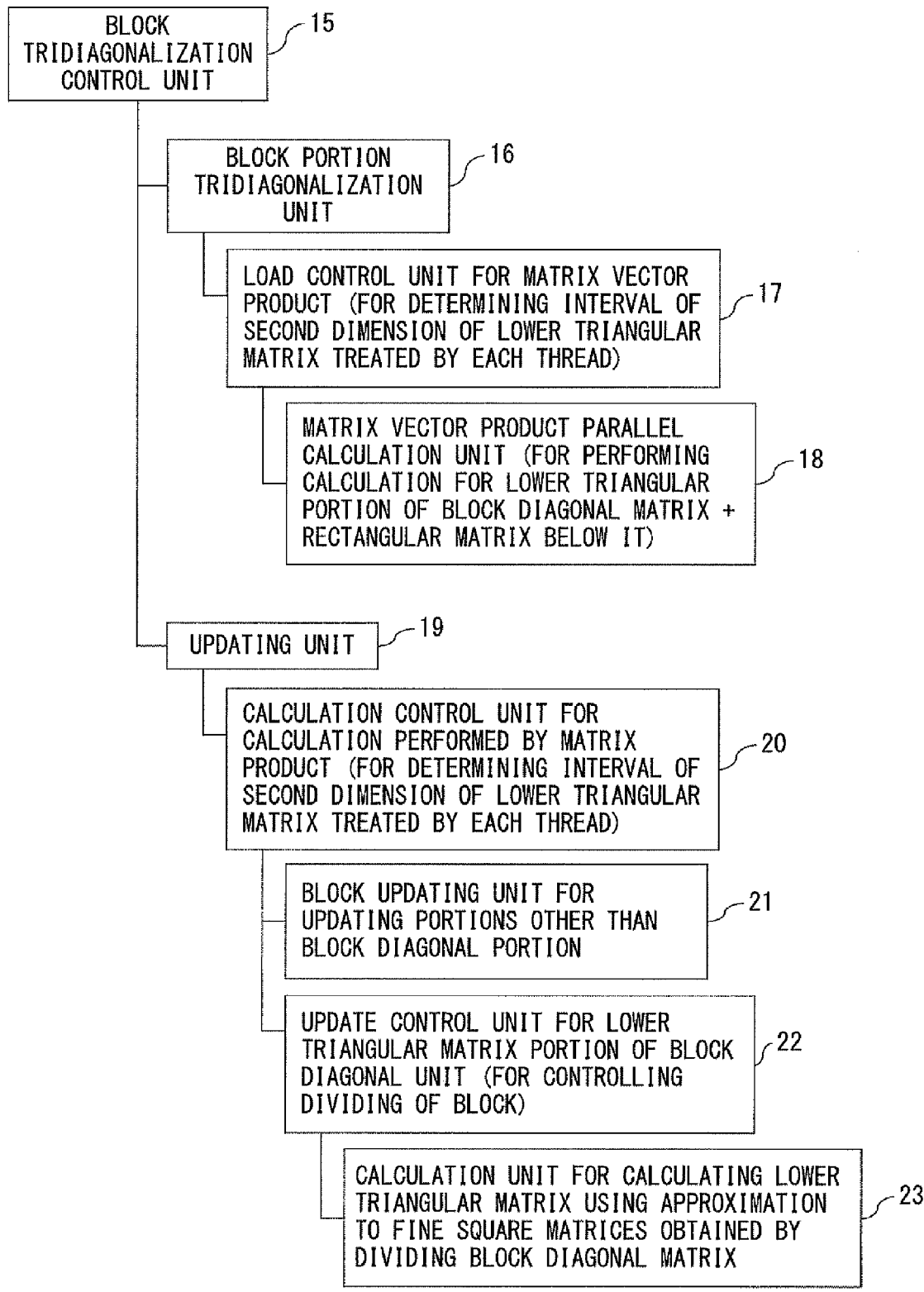
F I G. 9

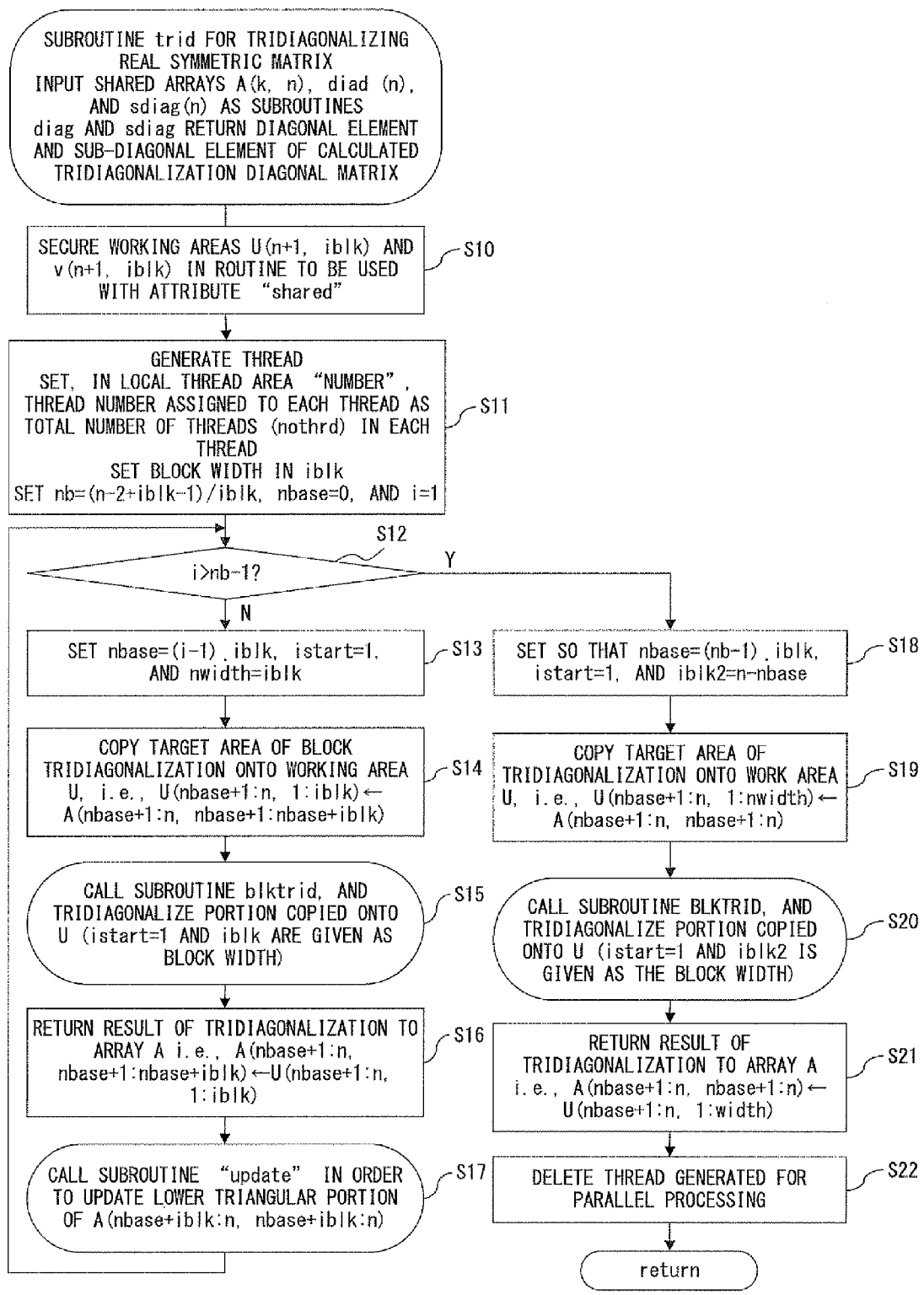
F I G. 1 2

US 8,527,569 B2

PARALLEL PROCESSING METHOD OF TRIDIAGONALIZATION OF REAL SYMMETRIC MATRIX FOR SHARED MEMORY SCALAR PARALLEL COMPUTER

CROSS-REFERENCE TO RELATED APPLICATION

This application is a continuation application of International PCT Application No. PCT/JP2007/000424, filed on Apr. 19, 2007, the entire contents of which are incorporated herein by reference.

FIELD

The embodiments discussed herein are related to a parallel processing method that enables high-speed processing of tridiagonalization of real symmetric matrices in shared memory scalar parallel computers.

BACKGROUND

As a method of solving eigenvalue problems of real symmetric matrices, there is a method in which tridiagonalization is performed so that the eigenvalue problems of real symmetric matrices are converted into eigenvalue problems of tridiagonal matrices. This method is costly in calculations for tridiagonalizing real symmetric matrices. Shared memory scalar parallel computers, which are less capable of accessing memory than vector computers, have improved algorithms in order to increase the amount of computation processed in units of memory accesses so that tridiagonalization is facilitated.

Patent Document 1 describes fundamental processing for block tridiagonalization.

In this method, however, the greatest part of the calculation cost consists of calculations of matrix vector products, and also matrix vector products greatly influence the memory access speed. Thus, this part of the calculation cost needs to be modified in order to improve the entire performance.

In a blocking method by which the computation amount is increased, it is important to calculate matrix vector products by making consecutive accesses and to perform those calculations parallelly and evenly by using respective CPUs. For this purpose, the updating of the entire matrix consists of the updating of the lower triangular portion and the copying of the upper triangular portion. In order to distribute the updating loads evenly, a matrix is divided into double of the number of CPUs in the column direction, and the computation amounts for updating are assigned to the respective CPUs in pairs including the i-th CPU and the "2×#CPU-(i-1)-th" CPU. However, this method is disadvantageous in that the memory areas to be referred to by the calculations of matrix vector products are distant so that the data in such areas interfere with data in cache, resulting in difficulty in storing the data in cache.

Finding a method that can harmonize the updating based on matrix vector products/matrix products with the load distribution and that can enable high-speed operation of matrix vector products is expected to lead to great improvement in performance.

Non Patent Document 1 and Non Patent Document 2 disclose a fundamental algorithm for tridiagonalization and parallel processing of tridiagonalization, respectively.

Patent Document 1:
Japanese Laid-open Patent Publication No. 2004-5528
Non Patent Document 1

G. H. Golub, C. F. van Loan, Matrix Computation Second Edition, Johns Hopkins University Press 1989
Non Patent Document 2
J. Choi, J. J. Dongarra, and D. W. Walker, "THE DESIGN OF A PARALLEL DENSE LINEAR ALGEBRA SOFTWARE LIBRARY: REDUCTION TO HESSENBERG, TRIDIAGONAL, AND BIDIAGONAL FORM", Engineering Physics and Mathematics Division, Mathematical Sciences Section, prepared by the Oak Ridge National Laboratory managed by Martin Marietta Energy System, Inc., for the U.S. DEPARTMENT OF ENERGY under Contract No. DE-AC05-84OR21400, ORNL/TM-12472.

SUMMARY

A parallel processing method according to the present invention is a parallel processing method for performing high-speed processing of tridiagonalization of a real symmetric matrix in a shared memory scalar parallel computer including a plurality of processors, the method including dividing a lower triangular matrix of the real symmetric matrix into as many column block matrices as there are processors, and loading the column block matrix onto a storage area in each of the processors; and making each of the processors perform computation in a longitudinal direction and a transverse direction of the real symmetric matrix for an element of a column block matrix read in a single loading operation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed

BRIEF DESCRIPTION OF DRAWINGS

FIG. 3 illustrates processing of block tridiagonalization (second);

FIG. 7 illustrates a parallel processing method according to an embodiment of the present invention (third);

FIG. 9 illustrates, in more detail, a parallel processing method according to an embodiment of the present invention (second);

FIG. 12 illustrates a flowchart for a process according to an embodiment of the present invention;

DESCRIPTION OF EMBODIMENTS

The present invention is based on a result of modifying the method of tridiagonalization in Patent Document 1.

An embodiment of the present invention uses a blocked algorithm so that a portion to be updated can be calculated highly densely when performing tridiagonalization. The symmetry in the matrix vector product portion is utilized in order to parallelly perform the operation of matrix vector products only of the lower triangular portion. In this calculation, the matrix vector product appears twice; however, reference is only made to memory once, as a shared access. Because only the lower triangular portion is used, the lower triangular matrix is divided dynamically so that the computation amount is distributed evenly. This eliminates the need for redundant copying, and also makes it easier to store, in cache, the content of memory referred to by the matrix vector products.

A matrix is divided in the column direction so that not only is the computation amount for updating by the matrix product of the lower triangular portion (rank-p update) uniform but the computation amount of the matrix vector products that refers to the matrix is also uniform (the areas of the results of dividing the lower triangular portion are uniform). In this state, each of the areas obtained by the division can be treated as an area consisting of two portions, a lower triangular portion and a rectangular portion. In the updating of a lower triangular portion, this portion is divided appropriately, and the resultant pieces are updated using several matrix products. When divided lower triangular portions including diagonal elements are updated using normal matrix products, the upper triangular portion will also be updated partially. However, the computation amount is reduced by reducing the computation of extra portions to the minimum possible amount so that the updating is performed with a computation amount close to that in the updating of only the lower triangular portion.

Figure 1:
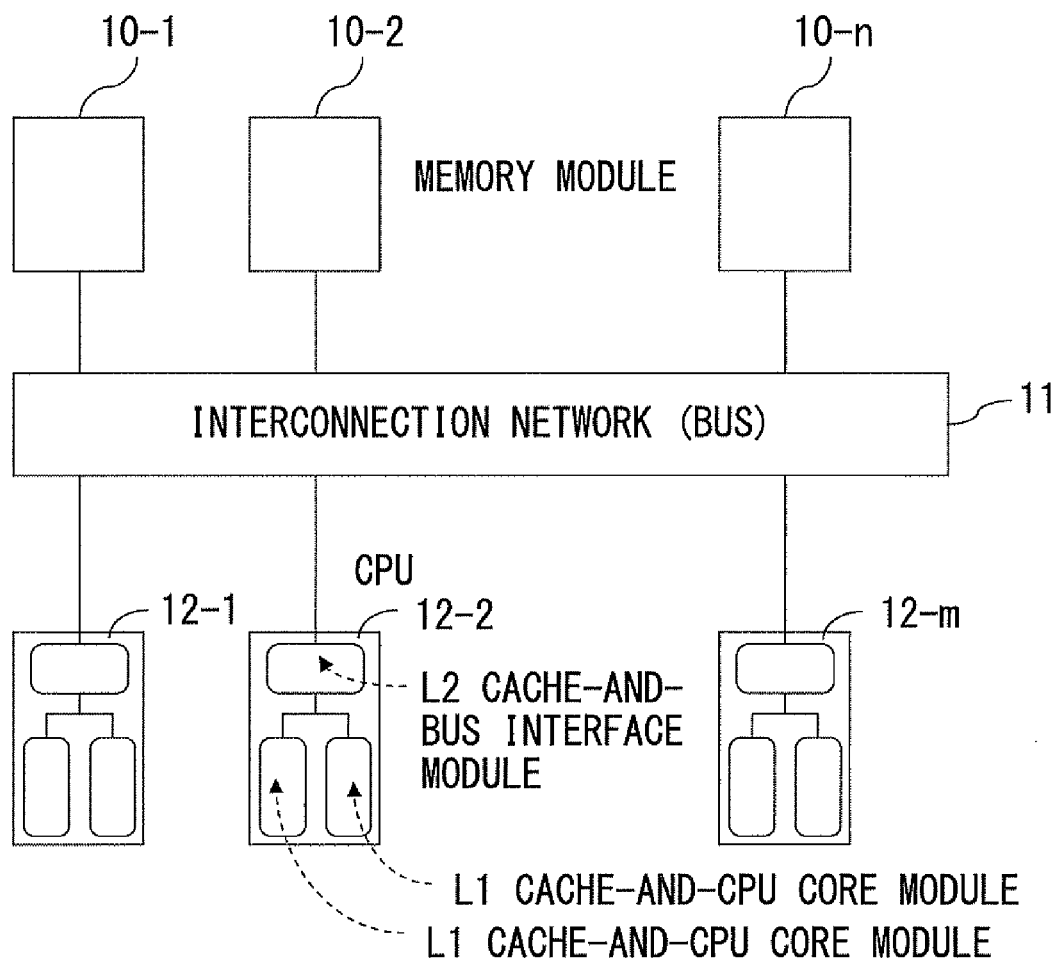
FIG. 1 is a block diagram illustrating a hardware configuration of a shared memory parallel computer on which the present invention is based.

FIG. 1 is a block diagram illustrating a hardware configuration of a shared memory parallel computer on which the present invention is based.

As illustrated in FIG. 1, the parallel computer on which the present invention is based has CPUs 12-1 through 12-m and memory modules 10-1 through 10-n connected to each other via an interconnection network 11 that includes a bus. The CPUs 12-1 through 12-m each include an L2 cache-and-bus interface module, and a plurality of L1 cache-and-CPU core modules connected to the L2 cache-and-bus interface module. This configuration is called a multi-core CPU. A multi-core CPU is constituted of a plurality of CPU cores (including L1 caches) embedded in a CPU, and each of the cores shares the L2 cache-and-bus interface. Each CPU core operates logically as if it were a CPU. In the example in FIG. 1, two CPU cores are embedded in one CPU; however, four CPU cores are embedded in one CPU in some cases.

FIGS. 2 through 4C explain block tridiagonalization computation.

An explanation will be given for the mathematical framework of tridiagonalization for obtaining an eigenvalue/eigenvector by referring to FIGS. 2 through 4C.

a) Mathematical Algorithm for Block Tridiagonalization

Figure 2:
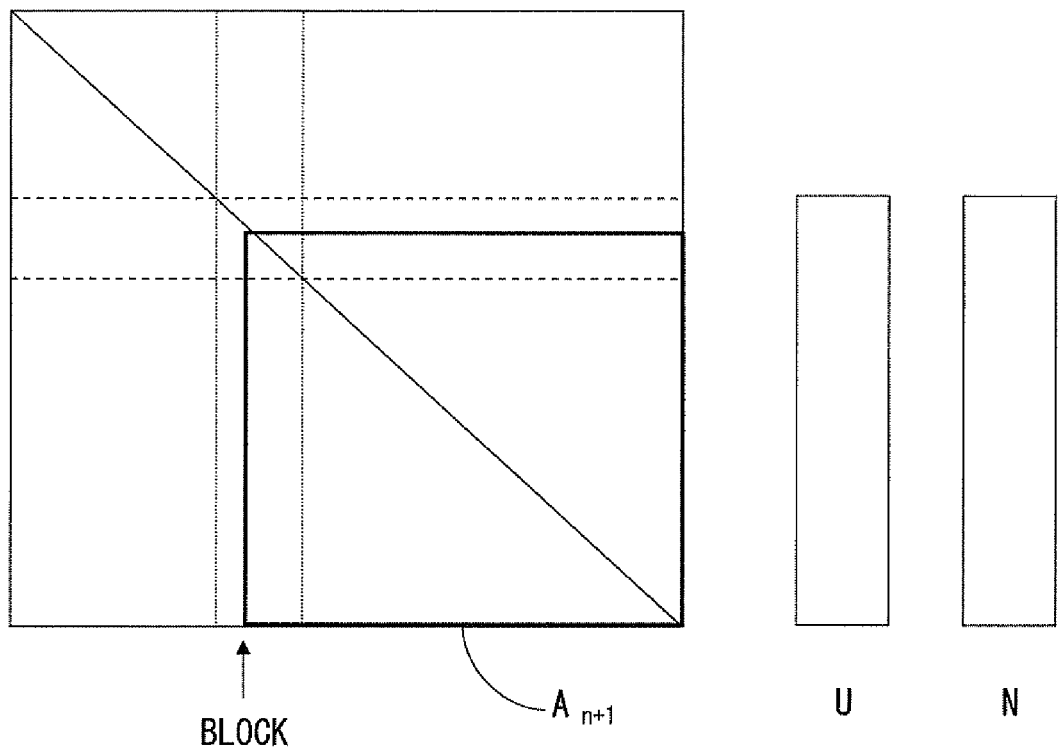
FIG. 2 illustrates processing of block tridiagonalization (first)

A matrix is tridiagonalized in units of the block width. A matrix is divided into blocks, and tridiagonalization is performed using the following block algorithm in units of the blocks. FIG. 2 illustrates the processing of the n-th block.

The process for the last block is terminated by applying the algorithm to the leftmost block, whose block width is 2.

Step 1 Generate Householder vector u from the row vector of n+1 of $A_n$

Step 2 calculate $v_i = A_{n+1} u$, $w_i = v_i - u(u^t v)/2$

Step 3 update $U_i$ and $W_i$ so that $U_i = (U_{i-1}, u_i)$ $W_i = (W_{i-1}, w_i)$ Step 4 if (i<blks) then update "n+i+1"-th row of $A_n$;

$A_n(*, n+i+1) = A_n(*, n+i+1) - U_i W_i(n+i+1, *)^t - W_i U_i(n+i+1, *)^t$ endif enddo step 5: $A_{n+blks} = A_n - U_{blks} W_{blks}^t - W_{blks} U_{blks}^t$ Next, an explanation is given for tridiagonalization based on the blocked Householder transformation. Blocked householder transformation is performed as described below.

$$v = (v_1, v_2, \ldots, v_n)$$

$$|v|^2 = v \cdot v = h^2,$$

When $U_v = (h, 0, \ldots, 0)^t$, $U_v = v - (v_1 - h, v_2, \ldots, vn)$ is satisfied. $U = (I - uu^t/|u|^2) = (I - \alpha uu^t)$ is satisfied, where $u = (v_1 - h, v_2, \ldots, v_n)$ In the following calculation, $\alpha$ is omitted.

$$\begin{aligned} A_{n+1} &= U^t A_n U \\ &= (I - uu^t) A (I - uu^t) \\ &= A_n - uu^t A_n - A_n uu^t + uu^t A_n uu^t \\ &= A_n - uv^t - vu^t + uv^t uu^t \\ &= A_n - uw^t - uu^t u^t v/2 - wu^t - uu^t u^t v/2 + uu^t u^t v \\ &= A_n - uw^t - wu^t \quad \ldots (*) \end{aligned}$$

where $w = v - u(u^t v)/2$, $v = A_n u$

When this is repeatedly used, $A_{n+k} = A_n - U_k W_k^t - W_k U_k^t \ldots$ (**) is satisfied.

In the calculation in the k-th step, $V_n$ can be calculated from (*) and (**) as follows:

$$v_k = A_n u^k - U_{k-1} W_{k-1}^t u_k - W_{k-1}^t u_k$$

$$w_k = v_k - u_k u_k^t v_k/2$$

$$U_k = (U_{k-1}, u_k), W_k = (W_{k-1}, w_k)$$

$$A_{n+k} = A_n - U_k W_k^t - W_k U_k^t$$

b) Storing Information That Constitutes A Householder Transformation

When an eigenvector is calculated, a Householder transformation used for the tridiagonalization is needed. Thus, Un and α are stored at the positions of the vector that constitute the Householder transformation. α is stored at the position of the corresponding diagonal element.

c) Method of Obtaining $U_i$ Effectively

In order to perform Householder transformation for the tridiagonalization of the blocked part, the next vector has to be updated. In order to perform this calculation as locally as possible, the working area of the block width part is copied to perform tridiagonalization, and the result of the tridiagonalization is stored in the original area. The calculation is performed with increased computation density in the form of a matrix product, and the next column vector is not updated. For this reason, the blocked part is tridiagonalized using a recursive program.

Figure 4A:
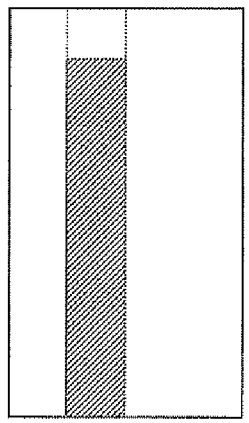
FIG. 4A illustrates processing of block tridiagonalization (third)
Figure 4B:
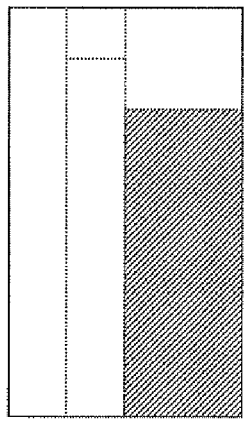
FIG. 4B illustrates processing of block tridiagonalization (fourth)
Figure 4C:
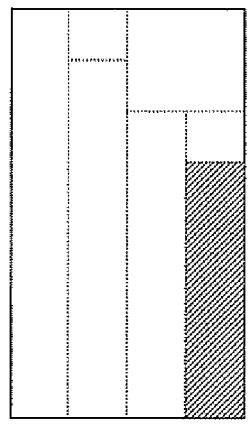
FIG. 4C illustrates processing of block tridiagonalization (fifth)

Specifically, the block area of matrix A, at the left side of FIG. 3, is copied onto a working area, and the block area is divided into the first update portion and the last update portion to process them recursively. FIGS. 4A through 4C illustrate the recursive process. When it is assumed that the shaded area is updated in FIG. 4A, the shaded area in FIG. 4B is updated next, and thereafter the shaded area in FIG. 4C is updated. In this manner, the first and last portions are updated in a nested manner. Specifically, when a recursive program is called to reach depth 2, the shaded area in FIG. 4A is updated as B in the first process, then the shaded area in FIG. 4B is updated, and thereafter the shaded area in FIG. 4C is updated. In the parallelization for the updating, the block matrix of the update part is divided uniformly in the vector direction, and the areas obtained by uniformly dividing each part by the processor are updated parallelly.

Figure 5:
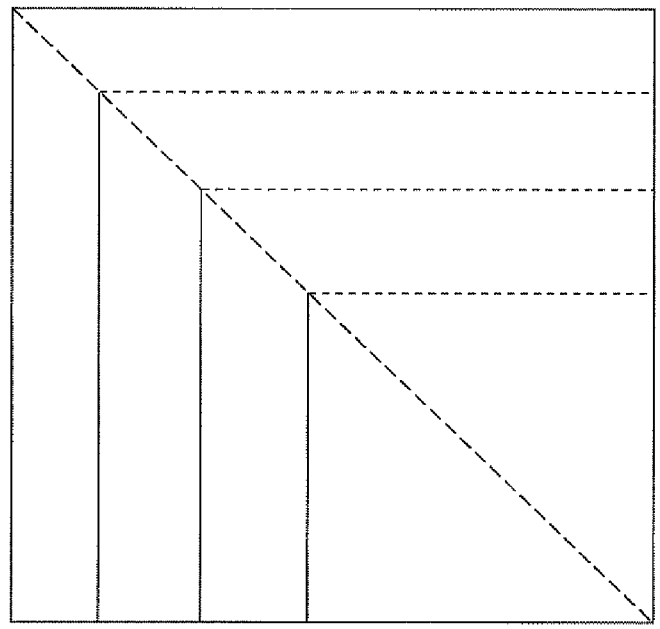
FIG. 5 illustrates a parallel processing method according to an embodiment of the present invention (first)
Figure 6:
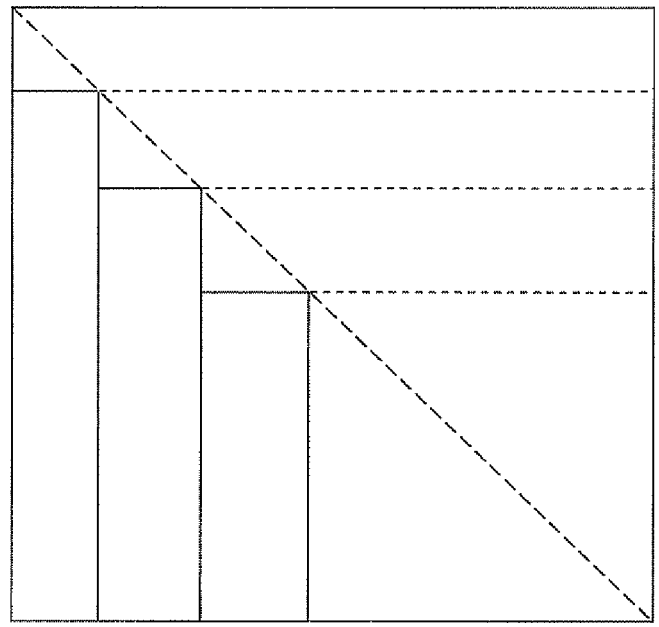
FIG. 6 illustrates a parallel processing method according to an embodiment of the present invention (second)
Figure 8:
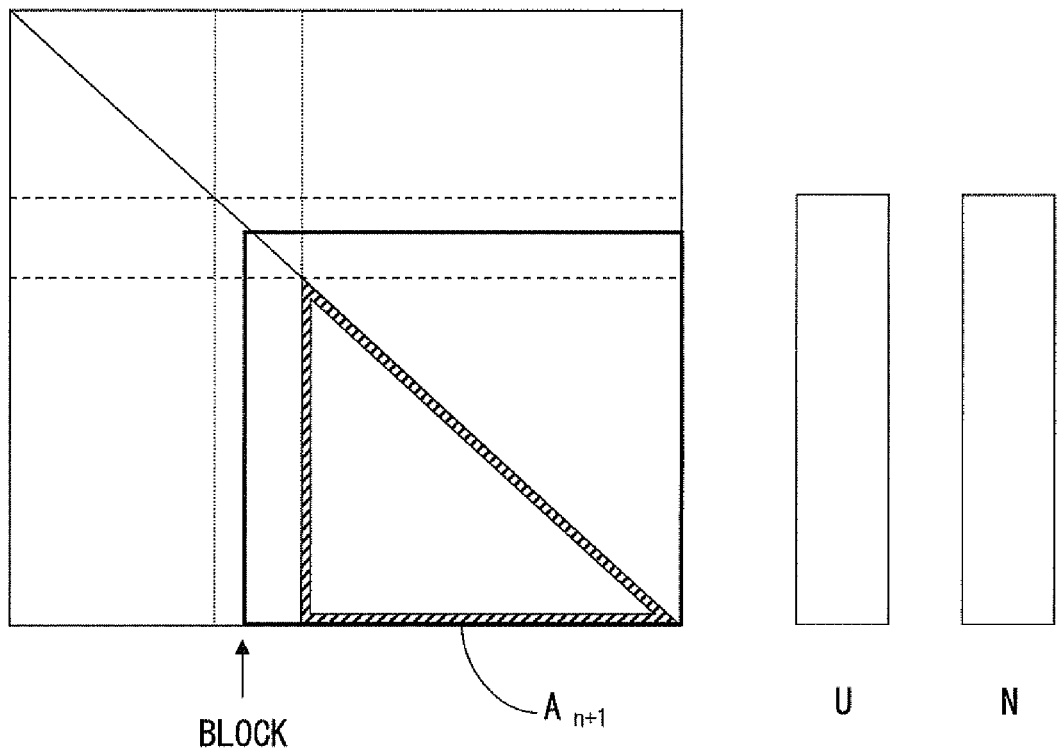
FIG. 8 illustrates, in more detail, a parallel processing method according to an embodiment of the present invention (first)

FIGS. 5 through 7 illustrate a parallel processing method according to an embodiment of the present invention.

1) A method in which computation is performed twice on a matrix vector product using only the lower triangular portion and through one access (loading)

As illustrated in FIG. 5, a matrix vector product is calculated using only the lower triangular portion. The size of a matrix used for the matrix vector product is assumed to be $N_n \times N_n$. When this is used in a 4-parallel configuration, the positions at which the lower triangular portion is divided into four portions are obtained in the following way.

$$i_m = N_n \times (1 - \mathrm{sqrt}(1 - m/\#p))$$

The results obtained under m=1, 2, and 3 correspond to the boundary positions. In the above expression, #p represents the total number used for the division, i.e., the parallel number.

By utilizing the symmetry in $A_n$, i.e., $A_n = A_n^t$, a matrix product is calculated from the information in the area to be processed by each processer.

Each portion includes lower triangular matrix portion $D_m$ of the diagonal block matrix portion and rectangular matrix $R_m$ below lower triangular matrix portion $D_m$.

The m-th portion, which is a result of dividing the lower triangular matrix into #P, is transposed, and the resultant value corresponds to the result of dividing the upper triangular portion in the row direction. According to this relationship, the calculations below are satisfied.

$$v_{xm1}(i_m+1:N_n) = R_m \times u_1(i_{m-1}+1:i_m) \quad \text{(expression 1)}$$

$$v_{xm2}(i_{m-1}1:i_m) = R_m^t \times u_1(i_m+1:N_n) \quad \text{(expression 2)}$$

$$v_{xm3}(i_{m-1}+1:i_m) = D_m \times u_1(i_{m-1}+1:i_m) \quad \text{(expression 3)}$$

$$v_{xm4}(i_{m-1}+1:i_m) = \mathrm{notdiag}(D_m)^t \times u_1(i_{m-1}+2:i_m) \quad \text{(expression 4)}$$

(notdiag(X) represents the lower triangular matrix obtained by removing the diagonal portion from lower triangular matrix X)

$$v_1 = \sum_{m=1}^{\#p} (v_{xm1} + v_{xm2} + v_{xm3} + v_{xm4}) \quad \text{[Expression 1]}$$

In this calculation, the calculations of $v_{xm1}$ and $v_{xm2}$ are performed simultaneously in an access to one element while accessing the elements in the matrix successively, and thereby it is possible to double the performance of the matrix vector product.

An example of a program executed simultaneously using expressions 1 and 2 is described below.

For the sake of simplicity, it is assumed that $R_m$ is a matrix n×m, $x_1$ is a vector of length of n, $x_2$ is a vector of length m, $y_1$ is a vector of length m, and $y_2$ is a vector of length n.

$x_1 = R \times y_1$ and $x_2 = R^t \times y_2$ are calculated commonly so that R is referred to.

```
x1(1:n)=0
do j=1,m
  tmp1=y1(j)
  sum=0
  do i=1,n
    tmp2=y2(i)
    tmp=R(i,j)
    x1(i)=x1(i)+tmp*tmp1
    sum=sum+tmp*tmp2
  enddo
  x2(j)=sum
enddo
```

In this case, x1 and y2 are small in data amount, and are accessed repeatedly, and accordingly they are cached so that they can be accessed at high speed. In comparison to accesses to R(i,j), the computation of x1 and x2 is so fast that it can be ignored, and thus the performance becomes twice the performance that would be obtained when performing the computation of matrix vector products separately.

The equation for calculating the boundary of the division, $i_m = N_n \times (1 - \mathrm{qsrt}(1 - m/\#p))$ can be obtained in the following manner.

Each of the CPUs is assigned the same number of computations. Thus, it is assumed that the areas corresponding to the matrices that are proportional to the number of elements (or the number of elements itself) are identical.

The calculation is performed on the assumption that $N_n^2 - (N_n - i_m)^2 = N_n^2 \times m/\#p$ and $r = i_m/N_n$.

$r^2 - 2r = m/\#p$ and $0 <= r <= 1$, where r is the square root $(r-1)^2 = m/\#p$ $r = 1 - \mathrm{sqrt}(1 - m/\#p)$ (the smaller is employed in the range of the square root)

2) Method Of Parallelizing Updated Portion and Calculating Diagonal Block Portion The lower portion is calculated using the symmetry of the updated portion in step 5. A matrix is divided so that each CPU (thread) is assigned a uniform amount of the computation for the update. The division is performed in the same manner as in the division using a matrix vector product.

The size of a matrix used for the matrix vector product is assumed to be $N_n \times N_n$. When a four-parallel configuration is adopted, the positions at which the lower triangular portion is divided into four portions are obtained in the following way:

$$i_m = N_n \times (1 - \mathrm{sqrt}(1 - m/\#p))$$

The results with m=1, 2, and 3 correspond to the boundary positions. In the above expression, #p represents the total number used for the division, i.e., the parallel number.

As has already been described, each of the areas obtained by the division in units of CPUs includes the diagonal block matrix portion and the rectangular matrix portion. FIG. 6 illustrates matrix $A_{n+I}$ divided in units of CPUs. The portion corresponding to the rectangular matrix portion is calculated using a normal matrix product, as in the expression below.

$$A_{n+k} = A_n - U_k W_k^t - W_k U_k^t$$

The updating of the diagonal block matrix portion is performed as illustrated in FIG. 7. Specifically, a point is determined that divides the diagonal line into two lines of equal length for the lower triangular portion of the diagonal block. The lower triangular matrix is divided in the row and column directions from this point. The rectangular portion is updated by a matrix product. Two half-sized lower triangular matrices are generated, and a point dividing the diagonal line into two lines of equal length is similarly determined for each of these portions, and the division in the row and column directions are performed similarly. When the target lower triangular matrix has become sufficiently small, the upper triangular matrix is calculated together by the matrix product. Thereby, a simple recursive program can be produced.

The above parallel processing can implement tridiagonalization of real symmetric matrices at high speed and with scalability. The above method has proven to be twice the conventional methods in performance.

FIGS. 8 through 11 illustrate the parallel processing method according to an embodiment of the present invention in more detail.

In block tridiagonalization computation, the following processes are performed.

1) Tridiagonalization is performed in units of blocks. The upper block is tridiagonalized, and matrices U and W resulting from the tridiagonalization are used to update the square matrix that has been reduced by the distance of the block width (the lower triangular matrix is illustrated by the thick dotted lines in FIG. 8). However, this square matrix is a symmetric matrix, and therefore only the lower triangular matrix part (the triangle enclosed by the thick dotted lines) is updated to be used as the data of the upper triangular portion.

2) Tridiagonalization in units of blocks requires the calculation of a matrix vector product for a square matrix (An+1: the square matrix enclosed by the thick lines) represented by the thick lines in the block. This calculation continuously reduces the size of the square matrix by 1. This portion is also symmetric, and the lower triangular portion is used for the calculation.

The above calculation requires a great computation cost to perform the entire calculation. In order to cause a high effect in parallel processing, the following points have to be taken into consideration.

\# Most of the time taken for calculation of matrix vector products in a scalar computer allowing only slow memory accesses is used for memory accesses. Thus, it is important to reduce the cost of memory accesses.

\# When a lower triangular matrix portion is used using the symmetry of matrices, the loads are desirably distributed evenly in view of parallel processing.

Thus, a program in a configuration as below is prepared.

FIG. 9 is a functional block diagram of a program according to an embodiment of the present invention.

A block tridiagonalization control unit 15 includes a block portion tridiagonalization unit 16 and an updating unit 19. The block portion tridiagonalization unit 16 includes a load control unit 17 for a matrix vector product that determines the interval of the second dimension of the lower triangular matrix treated by each thread. The load control unit 17 includes a matrix vector product parallel calculation unit 18 for performing calculation for the lower triangular portion and the rectangular matrix of a block diagonal matrix. The updating unit 19 includes a load control unit for the calculation performed by the matrix product that determines the interval of the second dimension of the lower triangular matrix treated by each thread. The load control unit 20 further includes a block updating unit 21 for updating the portions other than the block diagonal portion, and an update control unit 22 for the lower triangular matrix portion of the block diagonal unit, and the update control unit 22 controls the division of the blocks. The update control unit 22 includes a calculation unit 23 for calculating the lower triangular matrix using the approximation using fine square matrices obtained by dividing a block diagonal matrix.

Figure 10:
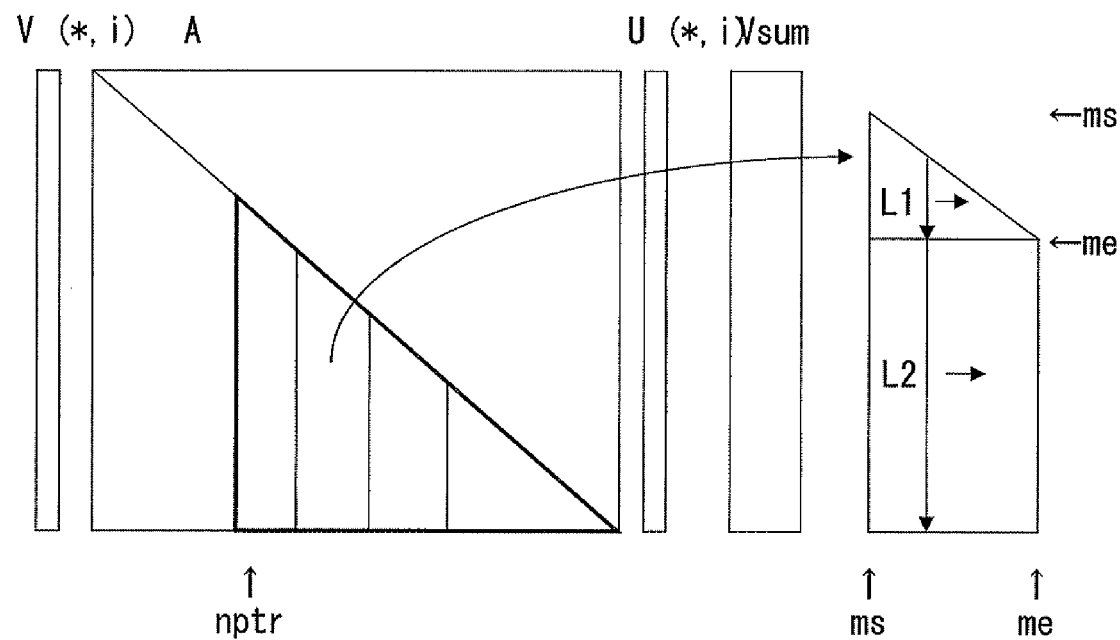
FIG. 10 illustrates, in more detail, a parallel processing method according to an embodiment of the present invention (third)

FIG. 10 illustrates a process of calculating a matrix vector product from a lower triangular matrix (that becomes smaller by 1 each time the process is performed).

In this example, the calculation of V(nptr:n)=A(nptr:n, nptr:n)*U(nptr:n) is performed, where nptr represents the leftmost element in the lower triangular matrix, n represents the rightmost element in the matrix, ms represents the point of origin treated by each thread, and me represents the value indicating the point of termination treated by each thread.

V(*, i), U(*,i), and vsum (1:n, numthrd), and entire matrix A having the attribute "shared", which are arrays are secured, and the following processes are performed.

1) vsum is cleared to zero in each thread so that vsum(nptr: n,nothrd)=0.

2) The above two calculations are simultaneously performed in the column direction of L2 by making reference as the arrow inside L2 in FIG. 10 shows. See the flowchart of matvec1, which will be explained later.

$$v\text{sum}(me+1{:}n) = L2*U(ms{:}me)$$

$$v\text{sum}(ms{:}me) = L2^t*U(me+1{:}n)$$

3) Calculate block diagonal portion using L1 vsum(ms:me) =vsum(ms:me)+L1*U(ms:me)+ND(L1)$^t$*U (ms:me,i) (ND (L1) is the lower triangular matrix obtained by setting 0 in the diagonal elements of L1)

4) Generate an interval in which nptr:n is divided evenly in units of threads. The point of origin is "is", and the point of termination is "ie". The termination of the calculation is confirmed by the barrier synchronization, and parallel processing is performed in each thread.

V(is:ie,i)=Σsum(is:ie,nothrd)
nothrd=1~numthrd
(nothrd ranges between thread number 1 and numthrd, numthrd being the total number of threads)

Figure 11:
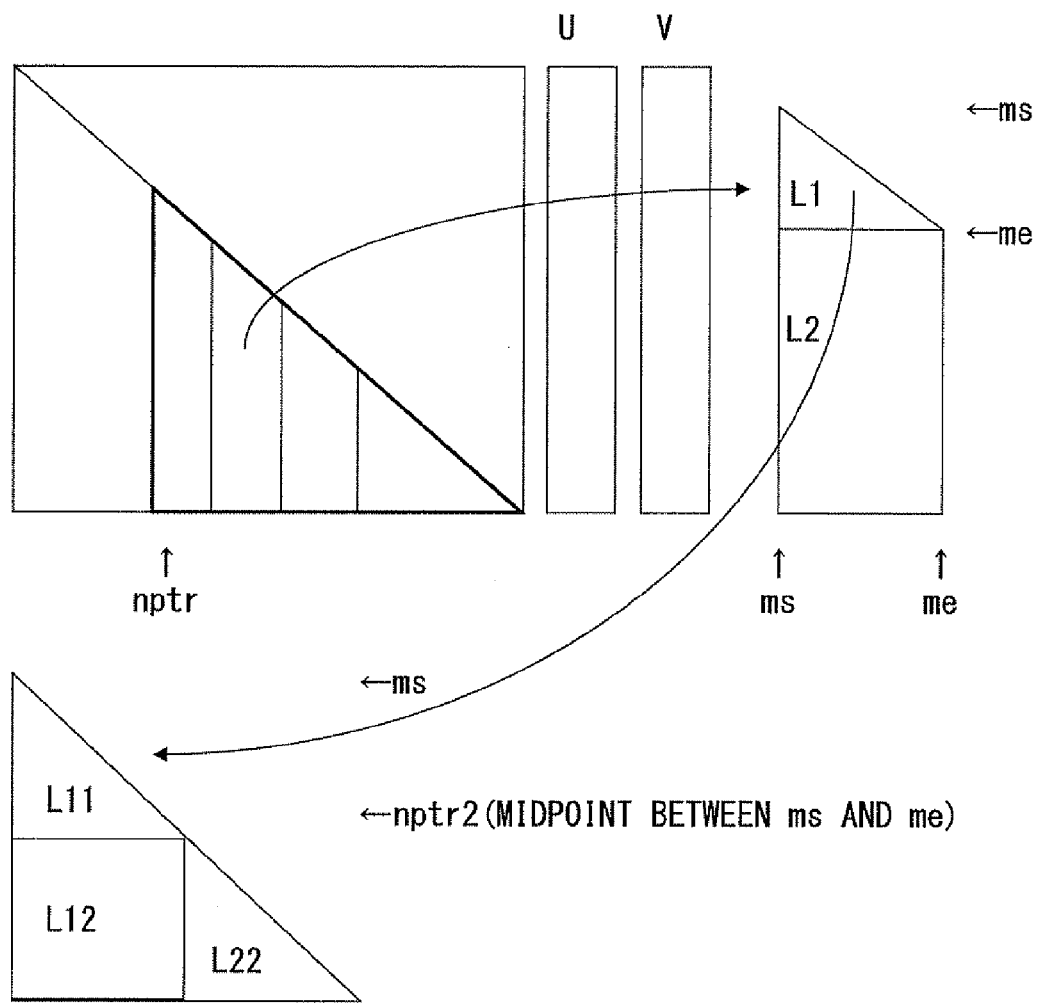
FIG. 11 illustrates, in more detail, a parallel processing method according to an embodiment of the present invention (fourth)

FIG. 11 illustrates processes performed by the updating unit.

The lower triangular matrix portion of A(nptr:n, nptr:n) is updated using the following expression.

$$A(nptr{:}n,nptr{:}n) = A(nptr{:}n,nptr{:}n) - U(nptr{:}n,1{:}blk)*W(nptr{:}n,1{:}blk)^t - W(nptr{:}n,1{:}blk)*U(nptr{:}n,1{:}blk)^t$$

In the above expression, nptr represents the leftmost element in the lower triangular matrix, blk represents the block width, n represents the rightmost element in the matrix, ms represents the point of origin treated by each thread, and me represents the point of termination treated by each thread.

L1 is divided into L11, L12, and L22 using the midpoints set on the perpendicular lines and the base. L11 and L22 are similarly divided using the midpoints to divide the lower triangular matrix into a group of square matrices, and this process is repeated.

When the block diagonal matrix has become sufficiently small, the calculation is performed using matrix products of normal matrices. This is implemented by a recursive program (see the flowchart for subroutine ltgemmtrt for detailed information).

FIGS. 12 through 20 illustrate the flowcharts for processes according to an embodiment of the present invention.

FIG. 12 illustrates a flowchart for subroutine trid for tridiagonalizing a real symmetric matrix. In this subroutine, shared arrays A(k, n), diad(n), and sdiag(n) are input. diag and sdiag are arrays used for returning the diagonal element and the subdiagonal element of the calculated tridiagonalization matrix.

In step S10, the working areas U(n+1, iblk) and v (n+1, iblk) are secured in a routine to be used with the attribute "shared". In step S11, a thread is generated. In each thread, the total number of threads is set in the local area, and the thread number (numerical order) assigned to each thread is set in nothrd, and the block width is set in iblk. Also, setting is performed so that nb=(n−2+iblk−1)/iblk, nbase=0, and i=1. In step S12, it is determined whether or not i>nb−1 is satisfied. When the determination result in step S12 is Yes, the process proceeds to step S18. When the determination result in step S12 is No, setting is performed so that nbase=(i−1)*iblk, istart=1, and nwidth=iblk in step S13. In step S14, the target area of block tridiagonalization is copied onto working area U, i.e., U(nbase+1:n, 1:iblk)←A(nbase+1:n,nbase+1:nbase+iblk). In step S15, subroutine blktrid is called, and the portion copied onto U is tridiagonalized (istart=1 and iblk are given as the block width). In step S16, the result of the tridiagonalization is returned to array A, i.e., A(nbase+1:n, nbase+1:nbase+iblk)←U(nbase+1:n, In step S17, subroutine "update" is called in order to the lower triangular portion of A(nbase+iblk:n, nbase+iblk:n). Thereafter, the process returns to step S12.

In step S18, setting is performed so that nbase=(nb−1)*iblk, istart=1, and iblk2=n−nbase. In S19, the target area of tridiagonalization is copied onto work area U, i.e., U(nbase+1:n, 1:nwidth)←A(nbase+1:n, nbase+1:n). In step S20, subroutine blktrid is called, and the portion copied onto U is tridiagonalized (istart=1 and iblk2 is given as the block width). In step S21, the result of the tridiagonalization is returned to array A, i.e., A(nbase+1:n, nbase+1:n)←U(nbase+1:n, 1:width). In step S22, the threads generated for the parallel processing are deleted, and the process exits from this subroutine.

Figure 13:
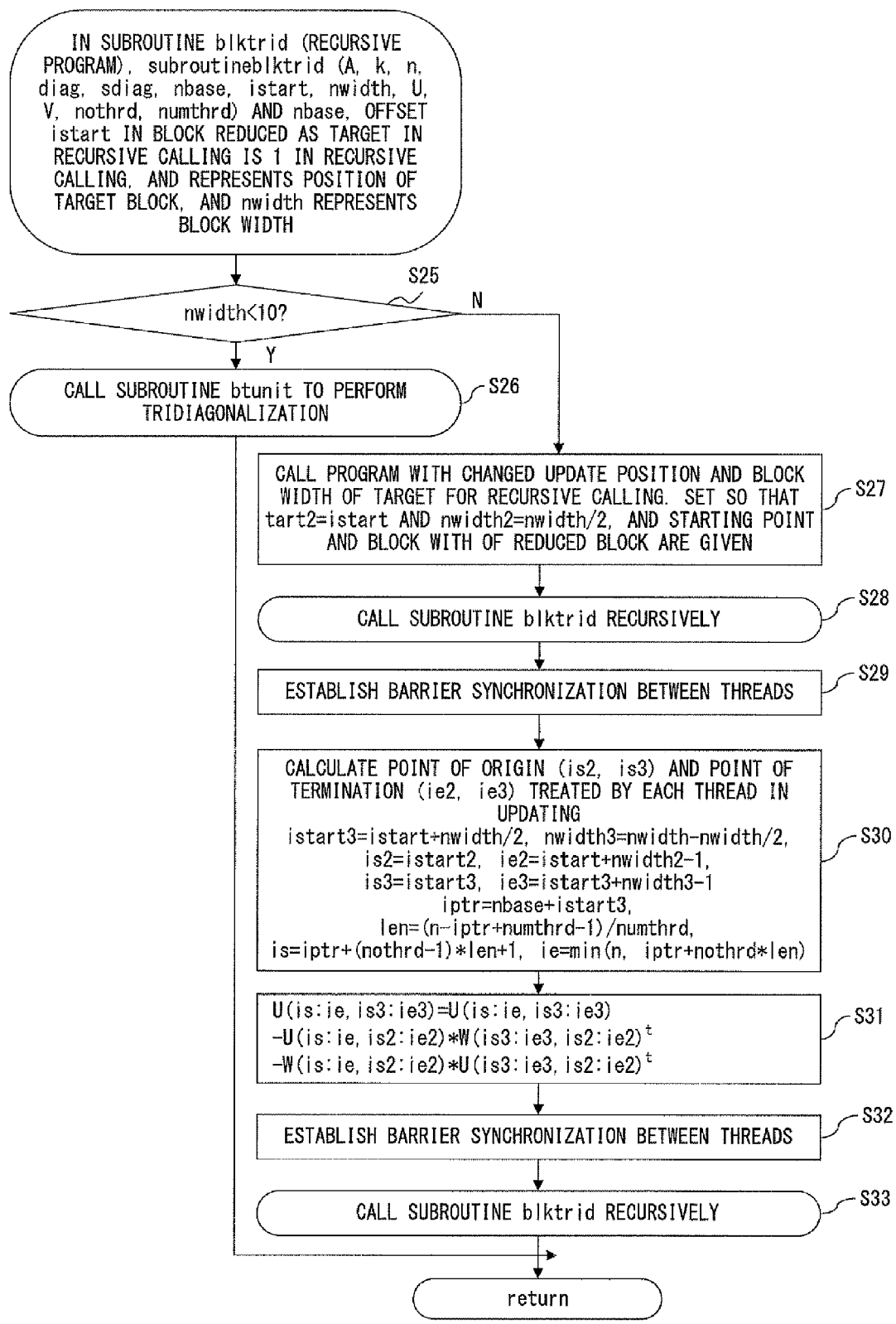
FIG. 13 illustrates a flowchart for a process according to an embodiment of the present invention.

FIG. 13 illustrates a flowchart of subroutine blktrid.

This subroutine is a recursive program. The program statement that is to be called is subroutine blktrid (A, k, n, diag, sdiag, nbase, istart, nwidth, U, V, nothrd, numthrd). In this statement, nbase represents the offset indicating the position of the block, istart represents the offset in the block in the divided block that is the target in the recursive calling, and the initial value of istart is 1, and indicates the position of the target block. nwidth represents the block width.

In step S25, it is determined whether or not nwidth<10 is satisfied. When the determination result in step s25 is Yes, subroutine btunit is called to perform tridiagonalization, and the process exits from this subroutine. When the determination result in step S25 is No, the subroutine is called with the target update position and block width changed so as to perform the recursive calling. Setting is performed so that istart2=istart and nwidth2=nwidth/2. The starting point and the block width of the divided block are given. In step S28, subroutine blktrid is called recursively. In step S29, barrier synchronization is achieved between the threads. In step S30, point of origin (is2, is3) and point of termination (ie2, ie3) treated in each thread for updating are calculated. Specifically, those two points are calculated using the following expressions.

$$istart3 = istart + nwidth/2, nwidth3 = nwidth - nwidth/2,$$
$$is2 = istart2, ie2 = istart + nwidth2 - 1, is3 = istart3,$$
$$ie3 = istart3 + nwidth3 - 1, iptr = nbase + istart3, len = (n - iptr + numthrd - 1)/numthrd, is = iptr + (nothrd - 1)$$
$$*len + 1, ie = \min(n, iptr + nothrd*len)$$

In step S31, setting is performed so that U(is:ie, is3:ie3)=U(is:ie, is3:ie3)-U(is:ie, is2:ie2)*W(is3:ie3, is2:ie2)$^t$-W(is:ie, is2:ie2)*U(is3:ie3, is2:ie2)$^t$ is satisfied.

In step S32, barrier synchronization is established between threads, and subroutine blktrid is called recursively, and thereafter, the process exits from this subroutine.

Figure 14:
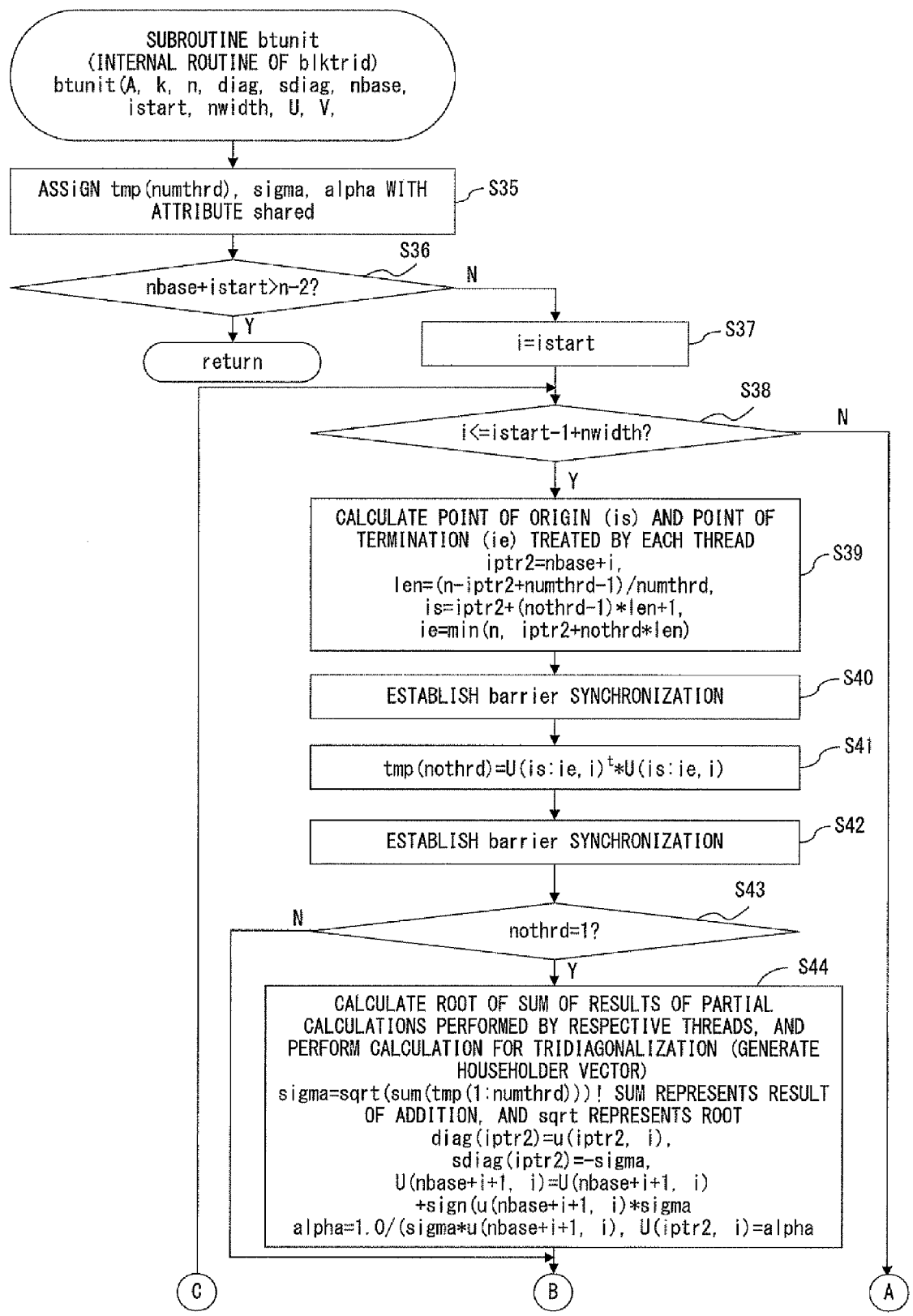
FIG. 14 illustrates a flowchart for a process according to an embodiment of the present invention.
Figure 15:
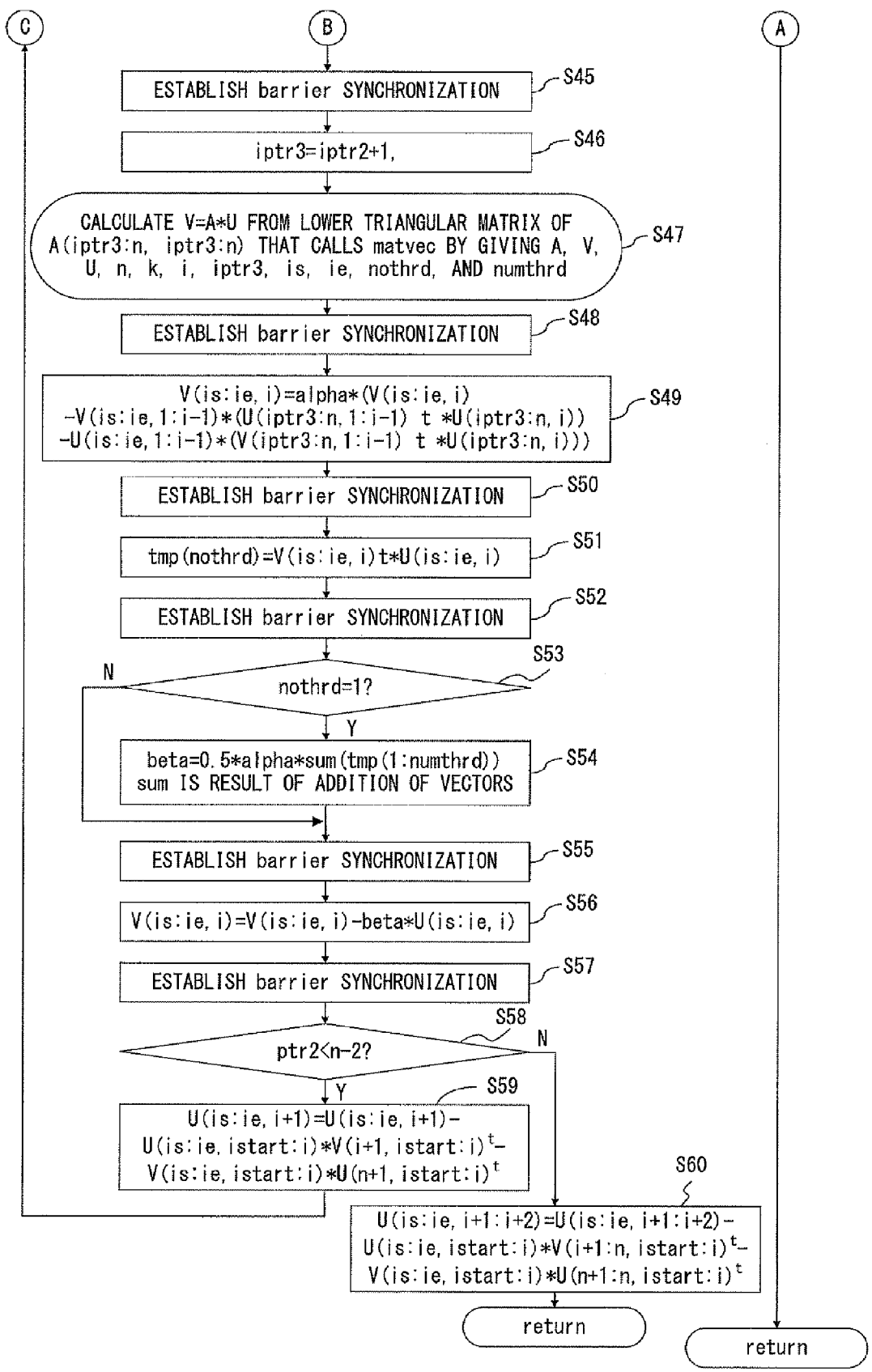
FIG. 15 illustrates a flowchart for a process according to an embodiment of the present invention.

FIG. 14 illustrates a flowchart for subroutine btunit.

The calling of this subroutine is performed by using btunit (A, k, n, diag, sdiag, nbase, istart, nwidth, U, V, nothrd, numthrd). In the explanation below, array tmp is a temporary array for calculation. In step S35, tmp(numthrd), sigma, and alpha are assigned with the attribute "shared". In step S36, it is determined whether or not nbase+istart>n−2 is satisfied. When the determination result in step S36 is Yes, the process exits from this subroutine. When the determination result in step S36 is No, setting is performed in step S37 so that i=istart, and it is determined whether or not i<=istart-1+nwidth is satisfied in step S38. When the determination result in step S38 is NO, the process exits from this subroutine. When the determination result in step S38 is Yes, point of origin (is) and point of termination (ie) treated by each thread are calculated in step S39. Specifically, the following expressions are calculated.

$$iptr2 = nbase + i, len = (n - iptr2 + numthrd - 1)/numthrd,$$
$$is = iptr2 + (nothrd - 1)*len + 1, ie = \min(n, iptr2 + nothrd*len)$$

In step S40, barrier synchronization is established. In step S41, setting is performed so that tmp (nothrd)=U (is:ie, i)$^t$*U (is:ie, i), and in step S42, barrier synchronization is established. In step S43, it is determined whether or not nothrd=1 is satisfied. When the determination result in step S43 is No, the process proceeds to step S45. When the determination result in step S43 is Yes, a calculation is performed to obtain the square root of the sum of the data as the results of the partial calculations in each thread, and calculation is performed for the tridiagonalization (generation of Householder vector). Specifically, the following expressions are calculated, where sum represents the result of the addition, and sqrt represents the square root.

$$sigma = sqrt(sum(tmp(1:numthrd)))diag(iptr2) = u(iptr2, i), sdiag(iptr2) = -sigma, U(nbase + i + 1, i) = U(nbase + 1, i) + sign(u(nbase + i + 1, i)*sigma \, alpha = 1.0/(sigma*u(nbase + i + 1, i), U(iptr2, i) = alpha$$

In step S45, barrier synchronization is established. In step S46, setting is performed so that iptr3=iptr2+1. In step S47, subroutine matvec is called, receiving A, V, U, n, k, I, iptr3, is, ie, nothrd, and numthrd. In other words, V=A*U is calculated from the lower triangular matrix of A(iptr3:n, iptr3:n). In step S48, barrier synchronization is established. In step s49, the following expression is calculated.

$$V(is:ie,i) = alpha*(V(is:ie,i) - V(is:ie,1:i-1)*(U(iptr3:n, 1:i-1)^t*U(iptr3:n,i)) - U(is:ie,1:i-1)*(V(iptr3:n, 1:i-1)^t*U(iptr3:n,i)))$$

In step S50, barrier synchronization is established. In step S51, setting is performed so that tmp(nothrd)=V(is:ie, i)$^t$*U (is:ie, i), and in step S52, barrier synchronization is established. In step S53, it is determined whether or not nothrd=1 is satisfied. When the determination result in step S53 is No, the process proceeds to step s55. When the determination result in step S53 is Yes, setting is performed in step S54 so that beta=0.5*alpha*sum(tmp(1:numthrd)), where sum represents the result of the addition of the vectors. In step S55, barrier synchronization is established, and in step S56, setting is performed so that V(is:ie, i)=V(is:ie, i)-beta*U(is:ie, i), and thereafter barrier synchronization is established in step S57. In step S59, it is determined whether or not ptr2<n-2 is satisfied. When the determination result in step S59 is Yes, U(is:ie, i+1)=U(is:ie, i+1)-U(is:ie, istart:i)*V(i+1, istart:i)$^t$-V(is:ie, istart:i)*V(n+1, istart:i)$^t$ is calculated in step S60, and the process returns to step S38. When the determination result in step S59 is No, U(is:ie, i+1:i+2)=U(is:ie, i+1:i+2)-U(is:ie, istart:i)*V(i+1:n, istart:i)$^t$-V(is:ie, istart:i)*U(n+1:n, istart:i)$^t$ is calculated in step S61, and the process exits from the subroutine.

Figure 16:
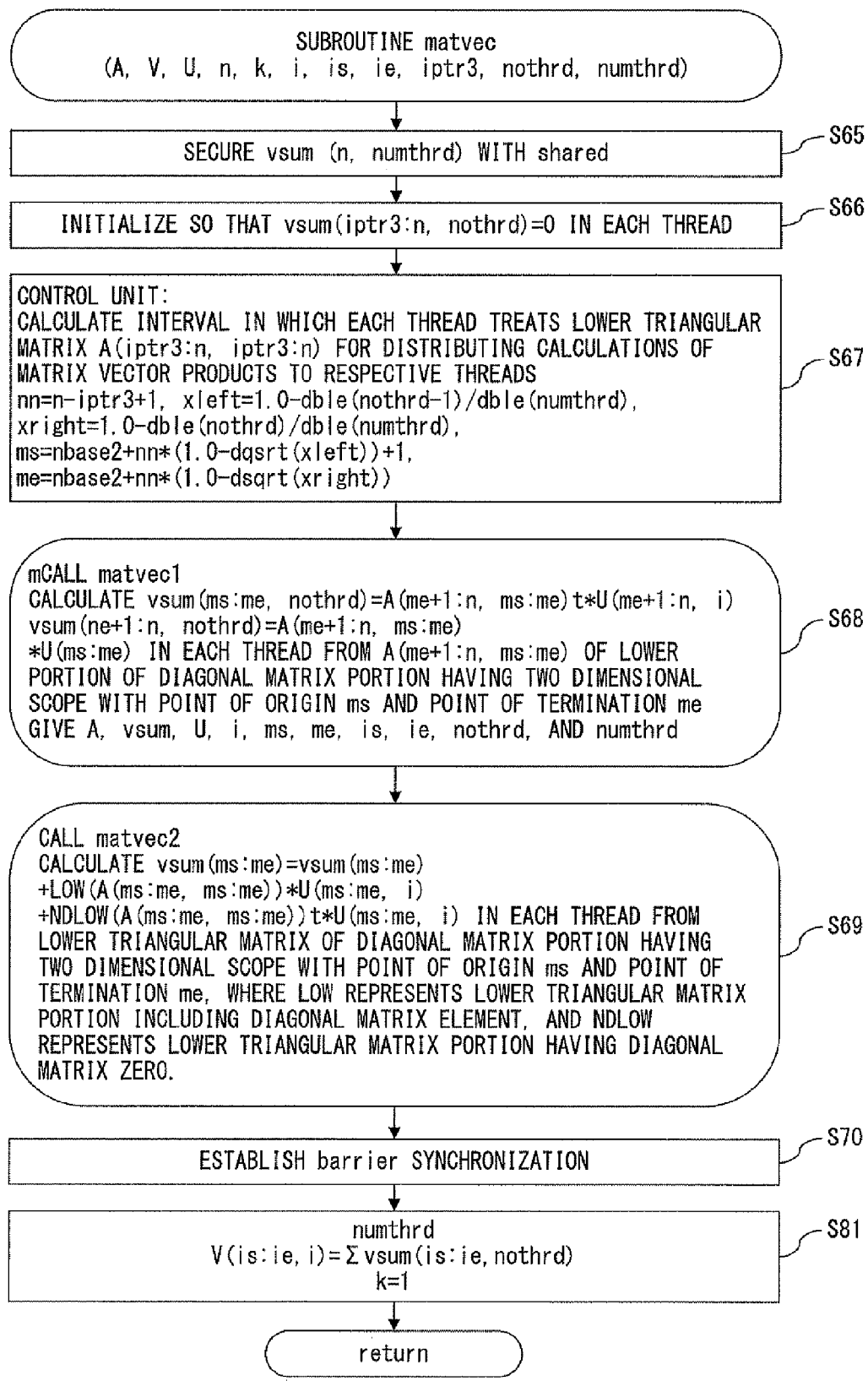
FIG. 16 illustrates a flowchart for a process according to an embodiment of the present invention.

FIG. 16 illustrates a flowchart for subroutine matvec.

A, V, U, n, k, I, is, ie, iptr3, nothrd, numthrd are used as parameters. In step S65, vsum(n, numthrd) is secured with the attribute "shared". In step S66, initialization is performed so that vsum(iptr3:n, nothrd)=0 in each thread. The control unit calculates the interval in which lower triangular matrix A (iptr3:n, iptr3:n) is assigned to each thread so that each thread can calculate a matrix vector product. Specifically, the following expressions are calculated.

$$nn=n-iptr3+1, xleft=1.0-\text{dble}(nothrd-1)/\text{dble}(numthrd), xright=1.0-\text{dble}(nothrd)/\text{dble}(numthrd), ms=n\text{base}2+nn*(1.0-d\text{qsrt}(xleft))+1, me=n\text{base}2+nn*(1.0-d\text{sqrt}(xright))$$

In step S68, matvec1 is called. In each thread, vsum(ms:me, nothrd)=A(me+1:n, ms:me)$^t$*U(me+1:n,i) vsum(ne+1:n, nothrd)=A(me+1:n,ms:me)*U(ms:me)

are calculated from A(me+1:n, ms:me) in the diagonal matrix portion whose lower triangular matrix has the second dimensional scope with point of origin ms and point of termination me. The parameters are A, vsum, U, I, ms, me, is, ie, nothrd, and numthrd.

In step S69, matvec2 is called. In each thread, vsum(ms:me)=vsum(ms:me)+LOW(A(ms:me, ms:me))*U(ms:me,i)+NDLOW(A(ms:me, ms:me))$^t$*U(ms:me,i) are calculated from the diagonal matrix portion whose lower triangular matrix has a second dimensional scope including point of origin ms and point of termination me.

LOW represents the lower triangular matrix portion including an diagonal element, and NDLOW represents the lower triangular matrix portion whose diagonal element is zero. The parameters are A, vsum, U, I, ms, me, is, ie, nothrd, and numthrd.

In step S70, barrier synchronization is established, and in step S71, expression 2 below is calculated, and thereafter the process exits from this subroutine.

$$V(is:ie, i) = \sum_{k=1}^{numthrd} vsum(is:ie, nothrd) \quad [\text{Expression 2}]$$

Figure 17:
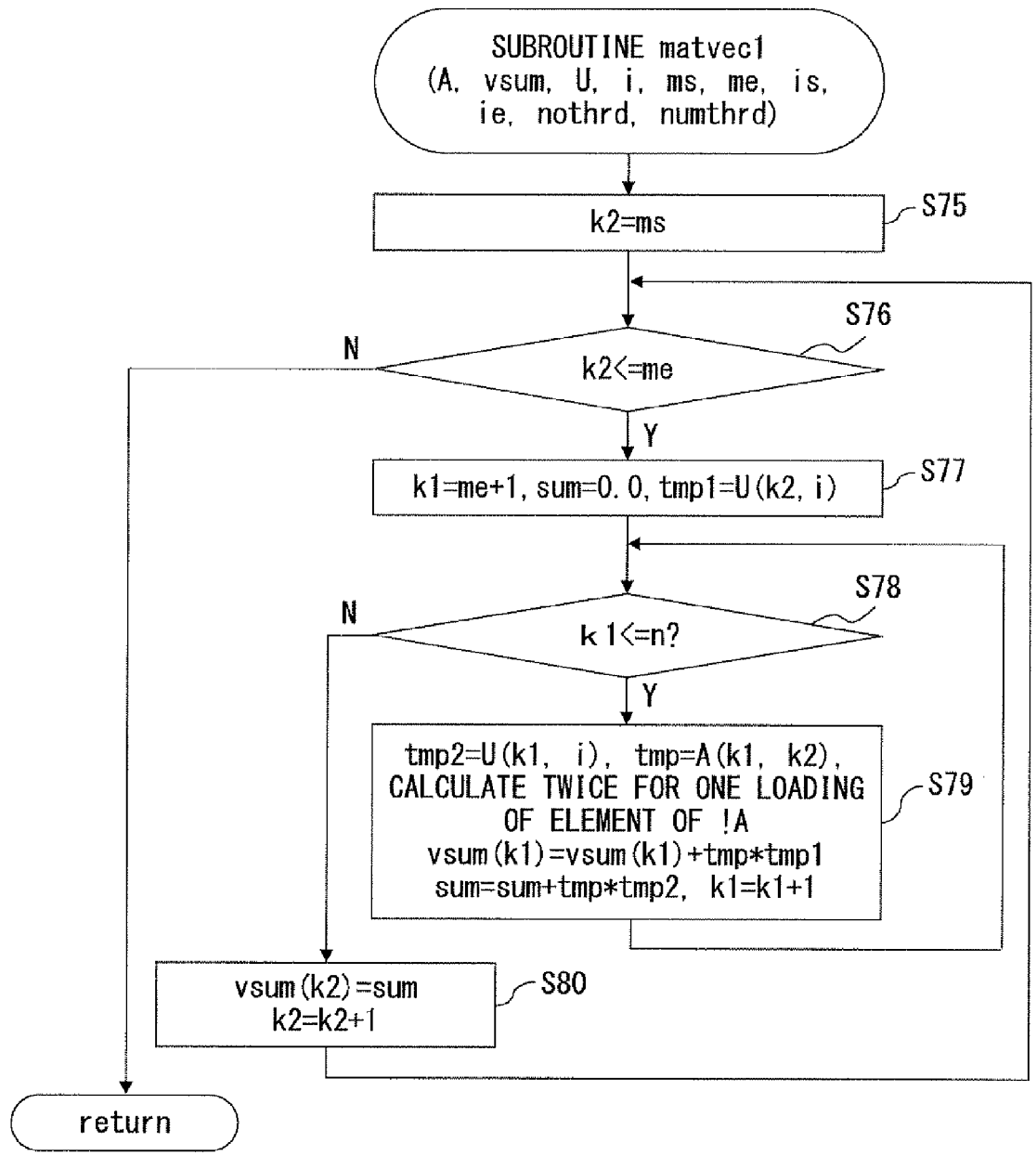
FIG. 17 illustrates a flowchart for a process according to an embodiment of the present invention.

FIG. 17 illustrates a flowchart of subroutine matvec1.

In step S75, setting is performed so that k2=ms. In step S76, it is determined whether or not k2<=me is satisfied. When the determination result in step S76 is No, the process exits from this subroutine. When the determination result in step S76 is Yes, setting is performed in step S77 so that k1=me+1, sum=0.0, and tmp1=U(k2,i). In step S78, it is determined whether or not k1<=n is satisfied. When the determination result in step S78 is Yes, setting is performed in step S79 so that tmp2=U(k1, i), tmp=A(k1, k2) (calculated twice with the element of A being loaded only once), vsum(k1)=vsum(k1)+tmp*tmp1, sum=sum+tmp*tmp2, and k1=k1+1, and thereafter, the process returns to step S78. When the determination result in step S78 is No, setting is performed so that vsum(k2)=sum and k2=k2+1 in step S80, and the process returns to step S76.

Figure 18:
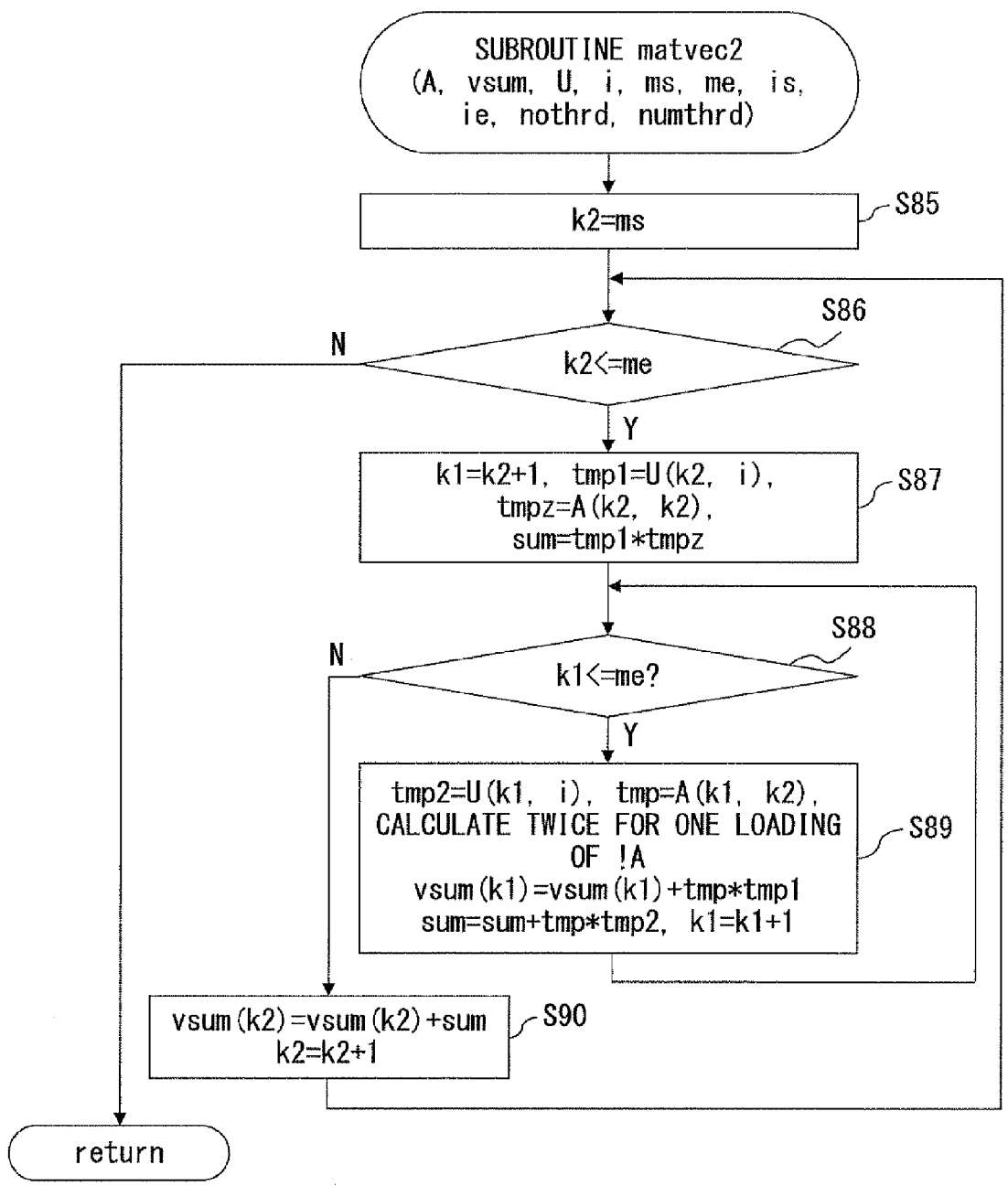
FIG. 18 illustrates a flowchart for a process according to an embodiment of the present invention.

FIG. 18 illustrates a flowchart for subroutine matvec2.

In step S85, setting is performed so that k2=ms. In step S86, it is determined whether or not k2<=me is satisfied. When the determination result in step S86 is No, the process exits from this subroutine. When the determination result in step S86 is Yes, setting is performed in step S87 so that k1=k2+1, tmp1=U(k2, i), tmpz=A(k2, k2), and sum=tmp1*tmpz. In step S88, it is determined whether or not k1<=me is satisfied. When the determination result in step S88 is Yes, setting is performed in step S89 so that tmp2=U(k1, i), tmp=A(k1, k2) (calculated twice with the element of A being loaded only once), vsum(k1)=vsum(k1)+tmp*tmp1, sum=sum+tmp*tmp2, and k1=k1+1, and thereafter the process returns to step S88. When the determination result in step S88 is No, setting is performed in step S90 so that vsum(k2)=vsum(k2)+sum and k2=k2+1, and the process returns to step S86.

Figure 19:
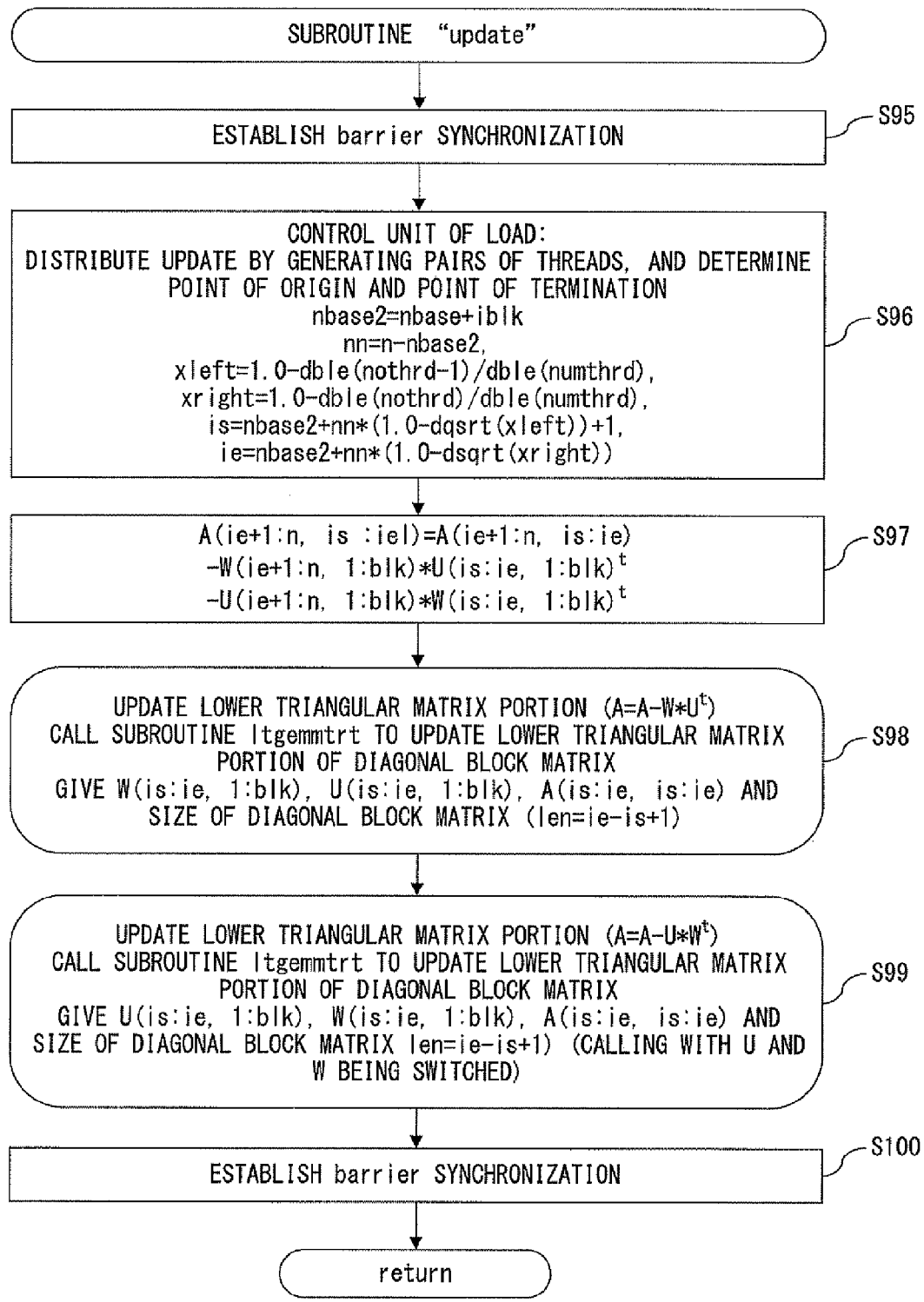
FIG. 19 illustrates a flowchart for a process according to an embodiment of the present invention.

FIG. 19 illustrates a flowchart for a subroutine "update".

In step S95, barrier synchronization is established. Step S96 is executed by the load control unit. In step S96, pairs are formed of individual threads to determine the point of origin and the point of termination for assigning the processes of updating. Specifically, the following expressions are calculated.

$$n\text{base}2=n\text{base}+i\text{blk},$$

$$nn=n-n\text{base}2,$$

$$xleft=1.0-\text{dble}(nothrd-1)/\text{dble}(numthrd),$$

$$xright=1.0-\text{dble}(nothrd)/\text{dble}(numthrd),$$

$$is=n\text{base}2+nn*(1.0-d\text{qsrt}(xleft))+1,$$

$$ie=n\text{base}2+nn*(1.0-d\text{sqrt}(xright))$$

In step S97, the following expression is calculated.

$$A(ie+1:n,is;ie1)=A(ie+1:n,is:ie)-W(ie+1:n,1:\text{blk})*U(is:ie,1:\text{blk})^t-U(ie+1:n,1:\text{blk})*W(is:ie,1:\text{blk})^t$$

In step S98, the lower triangular matrix portion is updated so that (A=A-W*U$^t$). Subroutine ltgemmtrt is called, and the lower triangular matrix portion of the diagonal block matrix is updated. W(is:ie, 1:blk), U(is:ie, 1:blk), A(is:ie, is:ie) and len=ie-is+1 (size of the diagonal block matrix) are given as the parameters.

In step S99, the lower triangular matrix is updated so that (A=A-U*W$^t$). Subroutine ltgemmtrt is called, and the lower triangular matrix portion of the diagonal block matrix is updated. U(is:ie, 1:blk), W(is:ie, 1:blk) and len=ie-is+1 (size of the diagonal block matrix) are given as the parameters. In other words, W is replaced with U to call the subroutine.

In step S100, barrier synchronization is established between the threads, and the process exits from this subroutine.

Figure 20:
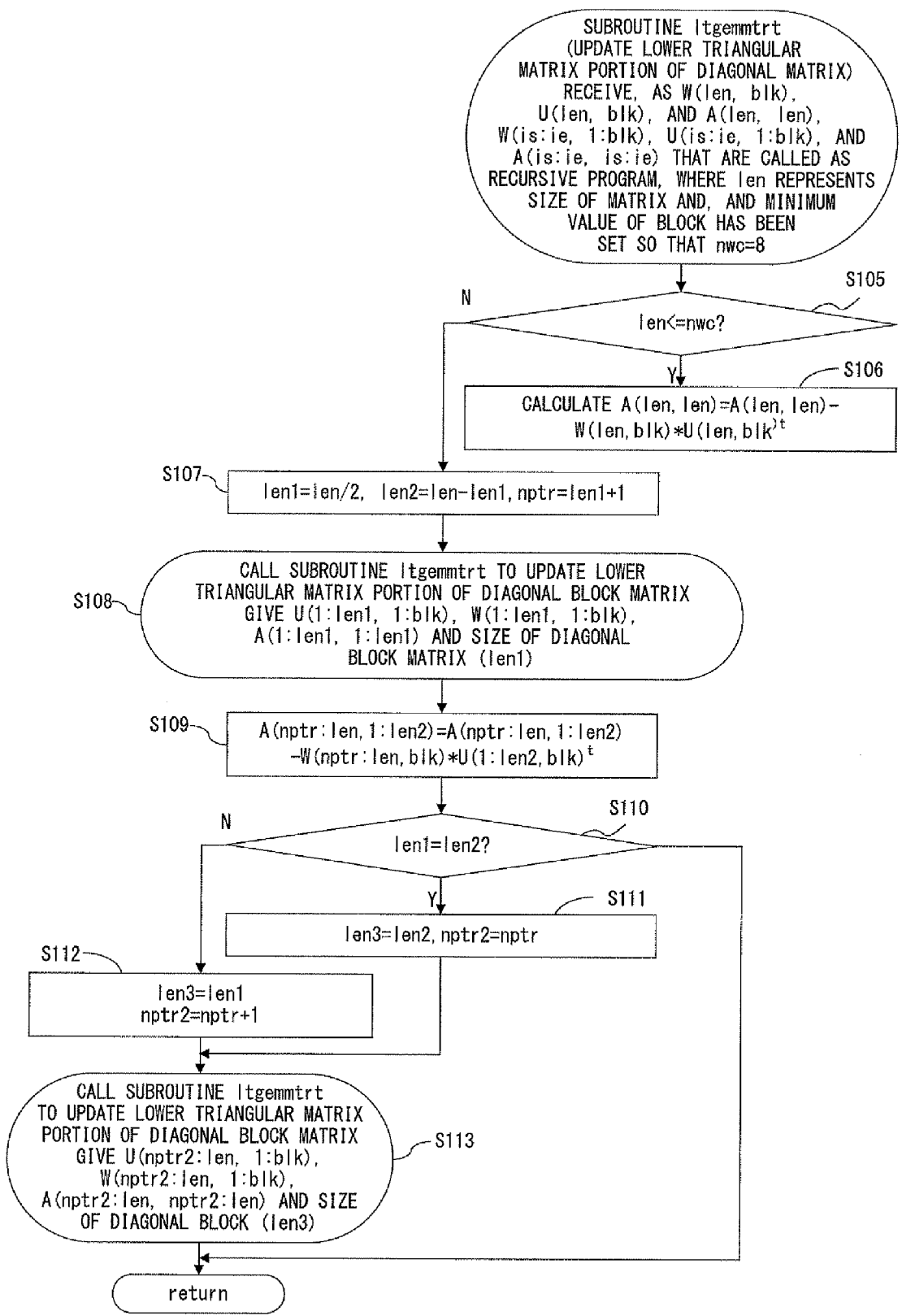
FIG. 20 illustrates a flowchart for a process according to an embodiment of the present invention.

FIG. 20 illustrates a flowchart for subroutine ltgemmtrt.

This subroutine updates the lower triangular matrix portion of a diagonal matrix, and is called a recursive program. W(is:

ie, 1:blk), U(is:ie, 1:blk), A(is:ie, is:ie) are received as W(len, blk), U(len, blk), and A(len, len) as parameters. len represents the size of the matrix. The block is divided repeatedly, and when the size of the block has reached the prescribed minimum value, the process of dividing a block is terminated. For example, the minimum value of the block is set so that nwc=8. In step S105, it is determined whether or not len<=nwc is satisfied. When the determination result in step S105 is Yes, A(len, len)=A(len, len)−W(len, blk)*U(len, blk)$^t$ is calculated in step S106. When the determination result in step S105 is No, setting is performed so that len1=len/2, len2=len−len1, and nptr=len1+1 in step S107, and subroutine ltgemmtrt is called to update the lower triangular matrix portion of the diagonal block matrix in step S108. For this update, U(1:len1, 1:blk), W(1:len, 1:blk), A(1:len1, 1:len1), and len1 (the size of the diagonal block matrix) are used as the parameters.

In step S109, A(nptr:len, 1:len2)=A(nptr:len, 1:len2)−W(nptr:len, blk)*U(1:len2, blk)$^t$ is calculated. In step S110, it is determined whether or not len1=len2. When the determination result in step S110 is Yes, setting is performed in step S111 so that len3=len2 and nptr2=nptr, and the process proceeds to step S113. When the determination result in step S110 is No, setting is performed in step S112 so that len3=len1 and nptr2=nptr+1, and thereafter the process proceeds to step S113. In step S113, subroutine ltgemmtrt is called, and the lower triangular matrix portion of the diagonal block matrix is updated. U(nptr2:len, 1:blk), W(nptr2:len, 1:blk), A(nptr2:len, nptr2:len), and len3 (size of the diagonal block) are used as the parameters. After step S113, the process exits from this subroutine.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A parallel processing method for performing high-speed processing of tridiagonalization of a real symmetric matrix in a shared memory scalar parallel computer including a plurality of processors, said method comprising:
    performing a block tridiagonalization process in which each of plurality column block matrices is tridiagonalized, comprising:
        dividing a lower triangular matrix of a first real symmetric submatrix that is utilized in the block tridiagonalization process in a column direction;
        allocating the divided lower triangular matrix of the first real symmetric submatrix to the processors;
        making each of the processors load a corresponding one of the divided lower triangular matrix in a single loading operation;
        making each of the processors perform computation in a row direction and the column direction of the corresponding one of the divided lower triangular matrices in the computation of matrix-vector product in the block tridiagonalization process;
    updating the lower triangular block submatrix by replacing the lower triangular block submatrix with a lower triangular block matrix of a second real symmetric submatrix that is obtained by removing a corresponding column block matrix that is obtained as the result of the block tridiagonalization process from the column block matrices.

2. The parallel processing method according to claim 1, wherein:
    a diagonal block matrix is updated while recursively performing a process of dividing a lower triangular matrix of the diagonal block matrix of the first real symmetric matrix into one square matrix and two lower triangular matrices that are further smaller.

3. The parallel processing method according to claim 1, wherein:
    the real symmetric matrix and the first real symmetric submatrix are divided into the column block matrices in such a manner that an equal number of elements are assigned to each of the processors.

4. The parallel processing method according to claim 1, wherein:
    each of the processors is equipped with a plurality of CPU cores.

5. A parallel processing device for performing high-speed processing of tridiagonalization of a real symmetric matrix in a shared memory scalar parallel computer including a plurality of processors, said device comprising:
    a plurality of processors;
    an unit that performs block tridiagonalization process in which each of a plurality of column block matrices is tridiagonalized, comprising:
        a unit that divides a lower triangular matrix of a real symmetric submatrix that is utilized in the block tridiagonalization process in a column direction;
        a unit that allocates the divided lower triangular matrix of the real symmetric submatrix to the processors;
        a unit that makes each of the processors load a corresponding one of the divided lower triangular matrices in a single loading operation; and
        a unit that makes each of the processors perform computation in a row direction and the column direction of the corresponding one of the divided lower triangular matrices simultaneously in the computation of matrix-vector product in the block tridiagonalization process; and
    a unit that updates the lower triangular block submatrix by replacing the lower triangular block submatrix with a lower triangular block matrix of a second real symmetric submatrix that is obtained by removing a corresponding column block matrix that is obtained as the result of the block tridiagonalization process from the column block matrices.

* * * * *